US012209927B2

(12) United States Patent
Oswald et al.

(10) Patent No.: US 12,209,927 B2
(45) Date of Patent: Jan. 28, 2025

(54) PROTECTIVE EQUIPMENT MONITORING SYSTEM

(71) Applicant: McCue Corporation, Peabody, MA (US)

(72) Inventors: Evan Oswald, Marblehead, MA (US); David DiAntonio, Andover, MA (US)

(73) Assignee: McCue Corporation, Danvers, MA (US)

( * ) Notice: Subject to any disclaimer, the term of this patent is extended or adjusted under 35 U.S.C. 154(b) by 1043 days.

(21) Appl. No.: 17/019,805

(22) Filed: Sep. 14, 2020

(65) Prior Publication Data

US 2021/0088394 A1 Mar. 25, 2021

Related U.S. Application Data

(60) Provisional application No. 62/903,434, filed on Sep. 20, 2019.

(51) Int. Cl.
| | |
|---|---|
| *G06Q 10/063* | (2023.01) |
| *G01L 5/00* | (2006.01) |
| *G05B 19/048* | (2006.01) |
| *G06Q 10/08* | (2024.01) |

(52) U.S. Cl.
CPC .......... *G01L 5/0052* (2013.01); *G05B 19/048* (2013.01); *G06Q 10/063* (2013.01); *G06Q 10/08* (2013.01); *G05B 2219/2604* (2013.01)

(58) Field of Classification Search
CPC ....... G01L 5/0052; G01L 5/00; G05B 19/048; G05B 19/04; G05B 19/02; G05B 19/00; G05B 2219/2604; G05B 2219/26; G05B 2219/20; G05B 2219/00; G05B 19/0421; G05B 19/042; G06Q 10/063; G06Q 10/06; G06Q 10/00; G06Q 50/28; G06Q 50/00
See application file for complete search history.

(56) References Cited

U.S. PATENT DOCUMENTS

| | | | | |
|---|---|---|---|---|
| 6,929,282 | B1 * | 8/2005 | Zoratti | B60R 21/33 180/274 |
| 8,762,009 | B2 * | 6/2014 | Ehrman | B60R 21/01 180/282 |
| 10,510,262 | B1 * | 12/2019 | Kim | G01L 5/0052 |
| 2007/0021915 | A1 * | 1/2007 | Breed | G01S 19/17 701/301 |
| 2012/0239224 | A1 * | 9/2012 | McCabe | B66F 9/063 701/2 |
| 2018/0050591 | A1 * | 2/2018 | Dudar | F02D 41/3005 |
| 2018/0276909 | A1 * | 9/2018 | Harshbarger | G07C 5/008 |
| 2019/0130203 | A1 * | 5/2019 | Hudson | G06T 7/13 |
| 2020/0236343 | A1 * | 7/2020 | Holzer | G06T 15/10 |

* cited by examiner

*Primary Examiner* — Mohamed Charioui
(74) *Attorney, Agent, or Firm* — Occhiuti & Rohlicek LLP

(57) ABSTRACT

A monitoring system includes a storage device and a monitoring module. The monitoring module is configured to receive sensor data from a plurality of sensors installed on elements disposed in a facility, the sensor data characterizing an effect of physical impacts on the elements, store the sensor data in the storage device, and process the stored sensor data to generate information characterizing effects of the one or more physical impacts on the elements over time.

17 Claims, 3 Drawing Sheets

PROTECTIVE EQUIPMENT MONITORING SYSTEM

CROSS-REFERENCE TO RELATED APPLICATIONS

This application claims priority to U.S. Provisional Application No. 62/903,434, filed on Sep. 20, 2019, the contents of which are hereby incorporated by reference in their entirety.

BACKGROUND

This invention relates to monitoring protective equipment.

Many places of business have assets that require protection from accidents as well as everyday wear and tear. For example, warehouses have walls, columns, walkways, product racks, and products that need to be protected from damage caused by fork trucks, hand trucks, or other product handling machinery. Similarly, retail locations such as have similar features that need to be protected from damage caused by customers and their shopping carts.

Protective equipment exists for protecting those assets at places of business. The protective equipment includes but is not limited to bollards, cart storage corrals, bumpers, corner protection devices, rack end protection devices, pedestrian walkway protection devices, column protection devices, and doorway protection devices.

SUMMARY

Over time, protective equipment that is installed in places of business is struck by moving elements including shopping carts, fork trucks, hand trucks, and motor vehicles. Sometimes when a moving element strikes protective equipment, little to no damage is caused. Other times, the protective equipment is irreparably damaged and needs to be replaced. Furthermore, the cumulative damage caused by the protective equipment damage being repeatedly struck can eventually require that the protective equipment be replaced.

But places of business can have tens or hundreds of individual protective equipment elements distributed about their facility. It can be burdensome to have employees continuously monitor the protective equipment, so it is often the case that protective equipment becomes damaged and the damage goes unnoticed for some time. Furthermore, trends in the frequency and types of damage sustained by the protective equipment in a facility over time exist but may be difficult to ascertain because the damage is not visibly apparent, or employees are simply not paying attention to the protective equipment.

Aspects described herein relate to a monitoring system that uses sensors installed on protective equipment and in some examples on moving elements (e.g., hand carts, fork trucks, and automated guided vehicles (AGVs)) to detect and characterize interactions (e.g., impacts) between the moving elements and the protective equipment in places of business. The detected and characterized interactions are provided to decision makers (e.g., facility managers) at the places of business to aid them in determining the health and optimizing the configuration of their installed protective equipment In a general aspect, a monitoring system includes a storage device and a monitoring module. The monitoring module is configured to receive sensor data from a plurality of sensors installed on elements disposed in a facility, the sensor data characterizing an effect of physical impacts on the elements, store the sensor data in the storage device, and process the stored sensor data to generate information characterizing effects of the one or more physical impacts on the elements over time.

Aspects may include one or more of the following features.

The sensor data may include acceleration data. The sensor data may include directional information associated with the acceleration data. The monitoring module may be implemented at the facility and the plurality of sensors may communicate with the monitoring module wirelessly. The facility may include a local monitor in communication with the monitoring module and the plurality of sensors may communicate with the local monitor wirelessly, the local monitor transmitting the sensor data to the monitoring module. The monitoring module may be implemented in a computing cloud.

At least some of the sensors may be installed on protective equipment in the facility. At least some of the sensors may be installed on mobile equipment in the facility. The mobile equipment may include one of fork trucks, hand trucks, automated guided vehicles, and shopping carts. At least some of the sensors may be installed on one or more of bollards, column protectors, pedestrian barriers, corner protectors, bumpers, and rack end protectors.

Processing the stored sensor data may include identifying patterns in the sensor data. The patterns may be related to a frequency of one or more of the elements disposed in the facility being struck. The patterns may be related to a severity of the effect of impacts on one or more of the elements disposed in the facility. The patterns may include a time series of the effect of impacts on one or more of the elements disposed in the facility.

At least some of the sensors may include a gyroscope for measuring the effect of one or more impacts on the elements. The information characterizing effects of the one or more impacts on the elements over time may include a cumulative effect of impacts on one or more of the elements over time.

The monitoring module may be configured to present the information characterizing effects of the one or more impacts on the elements over time to a user. The presented information may include an indication that one or more of the elements is potentially damaged. The presented information may include a heatmap illustrating the effects of the one or more impacts on the elements in the facility over time. One or more of the elements in the facility includes may be critical facility equipment.

In another general aspect, a method includes monitoring physical impacts to protective equipment including receiving data relating to the physical impacts to the protective equipment, said data representative of multiple physical impacts to the protective equipment.

Aspects may include one or more of the following features.

Monitoring physical impacts may include receiving data from a protective element over time. The data may include a cumulative effect of impacts on one or more of the elements over time. Monitoring physical impacts may include receiving data from a plurality of protective elements. The protective elements may include at least one stationary protective element and at least one mobile protective element, wherein the data represents a first physical impact from the at least one stationary protective element and a second physical impact from the at least one mobile protective element.

The data may include a cumulative effect of impacts on at least one of the stationary protective element and at least one mobile protective element over time. The at least one stationary protective element may include a bollard. The at least one mobile protective element may include a forklift.

Other features and advantages of the invention are apparent from the following description, and from the claims.

DESCRIPTION

1 System Overview

Figure 1:
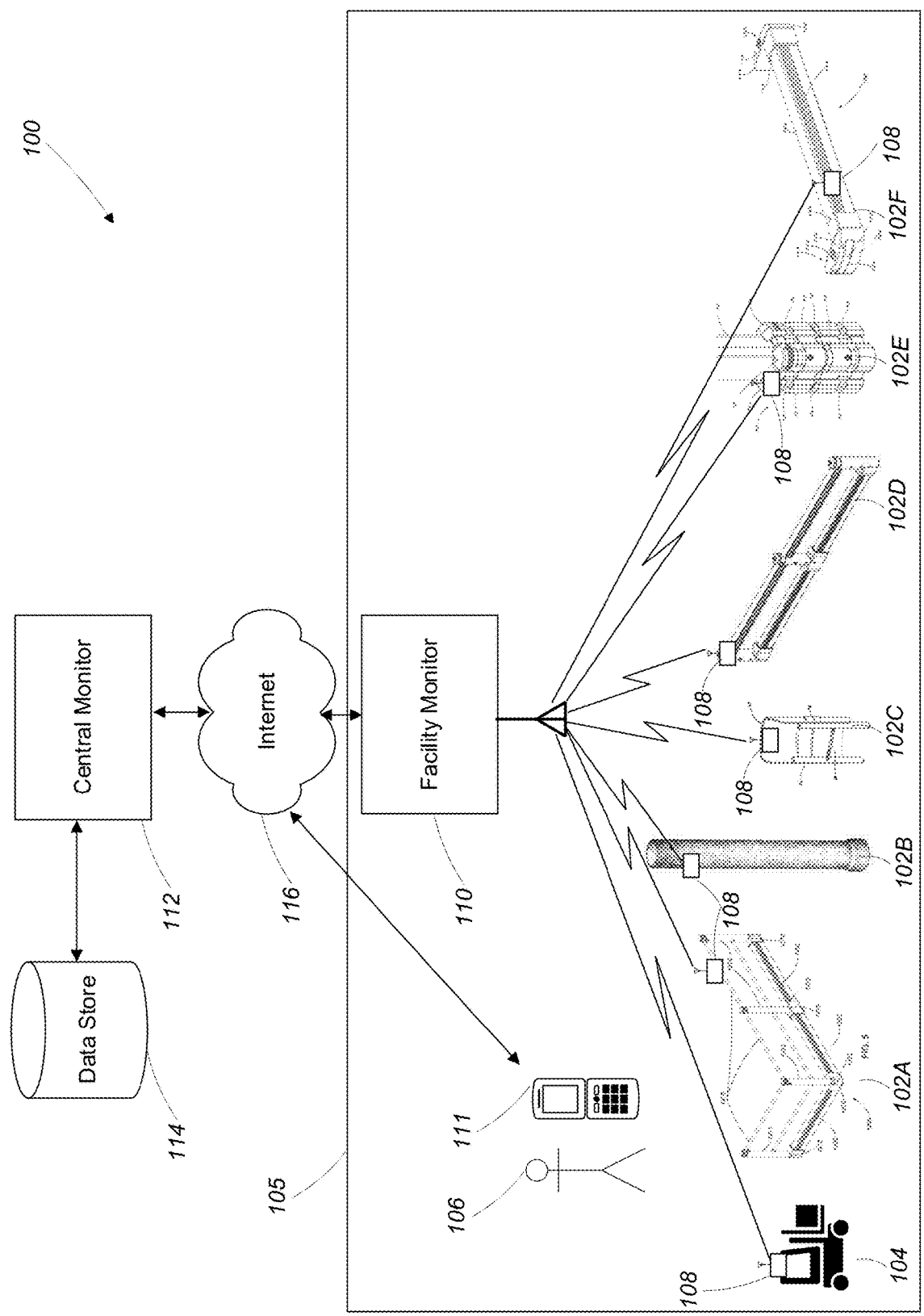
FIG. 1 is an equipment monitoring system.

Referring to FIG. 1, a protective equipment monitoring system 100 is configured to monitor interactions between protective equipment 102A-F, stock handling equipment 104 (e.g., a forklift or an automated guided vehicle (AGV)), and other entities (not shown) at a facility 105. The protective equipment monitoring system provides data characterizing those interactions to a user (e.g., a facility manager) 106 who uses the data characterizing the interactions to, for example, replace damaged protective equipment or reconfigure the protective equipment 102A-F.

The protective equipment monitoring system 100 includes a number of sensors 108 attached to corresponding ones of the protective equipment 102A-F or the equipment handling machinery 104, a local facility monitor 110, a central monitor 112, and a data store 114. Although facility monitor 110 is shown as being within facility 105, it might be external to the facility but within wireless communication of the protective equipment 105A-F.

The sensors 108 monitor interactions between the protective equipment 102A-F, the stock handling machinery 104, and any other entities present in a facility 105 and wirelessly report sensor data to the facility monitor 110. In some examples, the facility monitor 110 receives the sensor data and transmits the sensor data over a network (e.g., the internet 116 to a cellular device 111) 116 to the central monitor 112 located outside of the facility (e.g., in the 'cloud').

In some examples, the central monitor 112 processes the received sensor data and determines whether to issue one or more alerts to the user 106. For example, and as is described in greater detail below, if a sensor detects that one of the protective equipment 102A-F has been struck with a force exceeding a predetermined threshold, the central monitor 112 transmits a notification (e.g., over the internet 112) to the user 106 to inspect the struck protective equipment.

In another example, the central monitor 112 aggregates the sensor data in the data store 114 and processes the aggregated data to provide the user with patterns and trends that are identified in the aggregated data, as is described in greater detail below.

In yet another example, sensor data from sensors 108 attached to stock handling equipment 104 can be correlated with sensor data from sensors 108 attached to protective equipment 102A-F to determine which stock handling equipment 104 (and which drivers) are striking the protective equipment 102A-F.

2 Sensor

Figure 2:
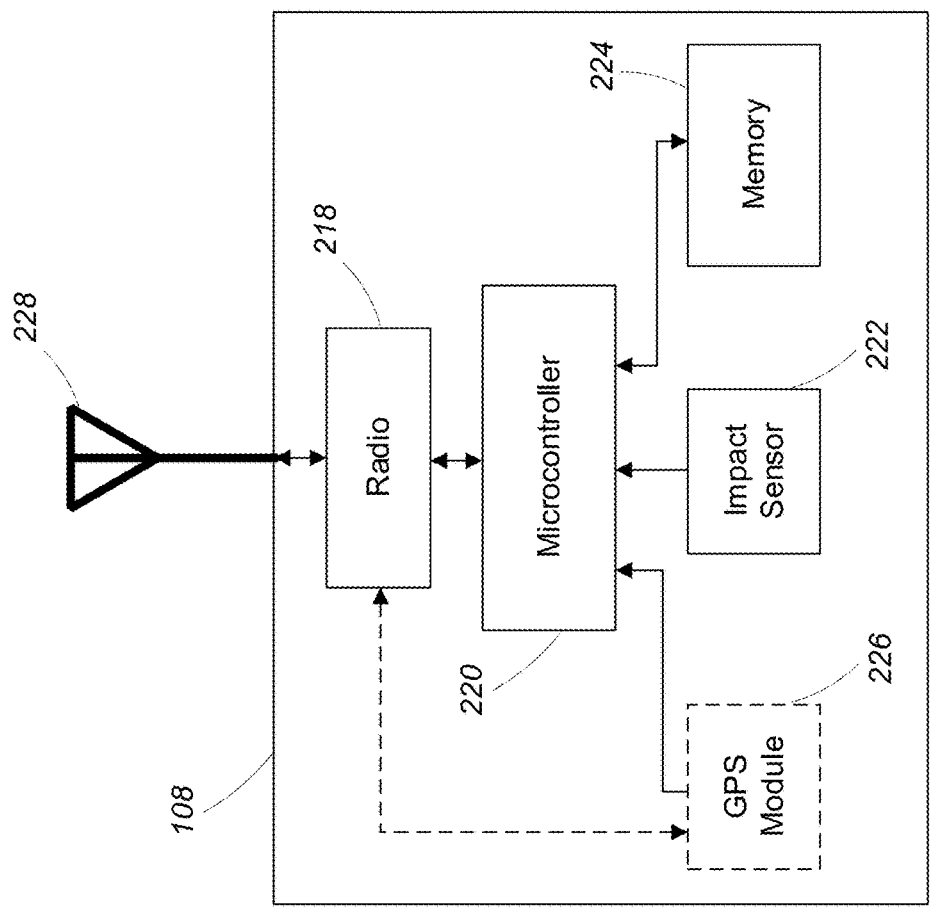
FIG. 2 is a sensor.

Referring to FIG. 2, in one example, each of the sensors 108 includes a radio module 218, a microcontroller 220, an impact sensor 222, a memory module 224, and an optional GPS module 226. The impact sensor 222 and the optional GPS module 226 provide data to the microcontroller 220 which, in some examples, stores the data (or a processed version of the data) in the memory module 224. The microcontroller 220 reads the data from the memory module 224 and uses the radio module 218 to transmit the sensor data over a radio frequency (RF) link to the facility monitor 110 of FIG. 1.

In some examples, the radio module 218 uses WiFi, Bluetooth, Near Field Communications (NFC) or Cellular protocols to communicate with the facility monitor 110 via an antenna 228. In other examples, the radio module 218 uses a proprietary radio frequency communication protocol such as Banner Engineering's SureCross frequency hopping spread spectrum (FHSS), time division multiple access (TDMA) communication protocol. More generally, the radio module 218 can use any communication protocol suitable for transmitting the sensor data to the facility monitor 110. In some examples, the radio module 218 employs encryption algorithms to communicate securely.

In some examples, the impact sensor 222 includes an accelerometer and/or a gyroscope for measuring an acceleration or an acceleration vector (e.g., in g-force or "g's") exerted on the sensor 108. In some examples, the impact sensor 222 is capable of measuring into the 100's of "g's."

The GPS module 226 is configured to interface with one or more antennae 228 (possibly separate from the antenna used by the radio module 218) to identify a global position of the sensor 108. In some examples of the sensor 108, the GPS module 226 is not needed and is either omitted or disabled.

In some examples, the memory module 224 stores sensor data until it is transmitted and then deletes the sensor data. In other examples, the memory module 224 stores a predetermined amount of sensor data or stores sensor data for a predetermined amount of time. (e.g., a running log of sensor data).

The microcontroller 220 can include any microcontroller that is suitable for interfacing with the GPS module 226, the impact sensor 222, the memory module 224, and the radio 218.

In some examples, the sensor 108 includes an adhesive or a connector (not shown) that facilitates attachment to a protective equipment element or stock handling equipment.

3 Data Processing and Aggregation

As is noted above, in some examples, sensor data from various sensors 108 in a facility 105 can be aggregated and used to identify trends and/or patterns in the data.

For example, a particular protective equipment element (e.g., a bollard) may be struck relatively lightly, but repeatedly. By analyzing aggregated sensor data for that bollard (e.g., using the central monitor 112), the monitoring system 100 may determine that the cumulative stress applied to the protective equipment device has damaged the device to an extent that it needs to be replaced.

In another example, the sensors 108 can be placed around a facility prior to protective equipment devices being installed. The data gathered from those sensors 108 can be used to determine an optimal configuration of protective equipment devices for the facility.

In another example, sensors 108 are placed on critical facility equipment (e.g., a hydrogen recharging station for forklifts) and used to monitor small levels of impacts that may affect the overall safety of the critical facility equipment. For example, impacts on the critical facility equipment that exceed small (e.g., 5 "g's") predetermined threshold will result in a notification being sent to the user 106.

More generally, the central monitor 112 can associate different thresholds with different sensors 108. For example, a sensor 108 on critical facility equipment such as a hydrogen recharging station may have a very small impact threshold associated with it such that any small impact will result in the user (e.g., facility manager) 106 being notified of the impact. On the other hand, a sensor 108 on a column protector may have a higher impact threshold associated with it such that only large or repeated impacts with heavy vehicles result in the user 106 being notified.

When multiple stock handling vehicles (e.g., multiple forklifts and/or AGVs) are present in a facility, they may each have a sensor 108 placed thereon. Collisions between the stock handling vehicles can then also be monitored.

In some examples, the aggregated data my indicate that certain types of protective equipment (e.g., short bollards) are more likely to be struck than other types (e.g., tall bollards). Such information can be useful in reconfiguring protective equipment at the facility and in designing new and improved protective equipment.

In some examples, sensor data is aggregated so it can later be displayed as either a cumulative or non-cumulative display of impacts over time.

Figure 3:
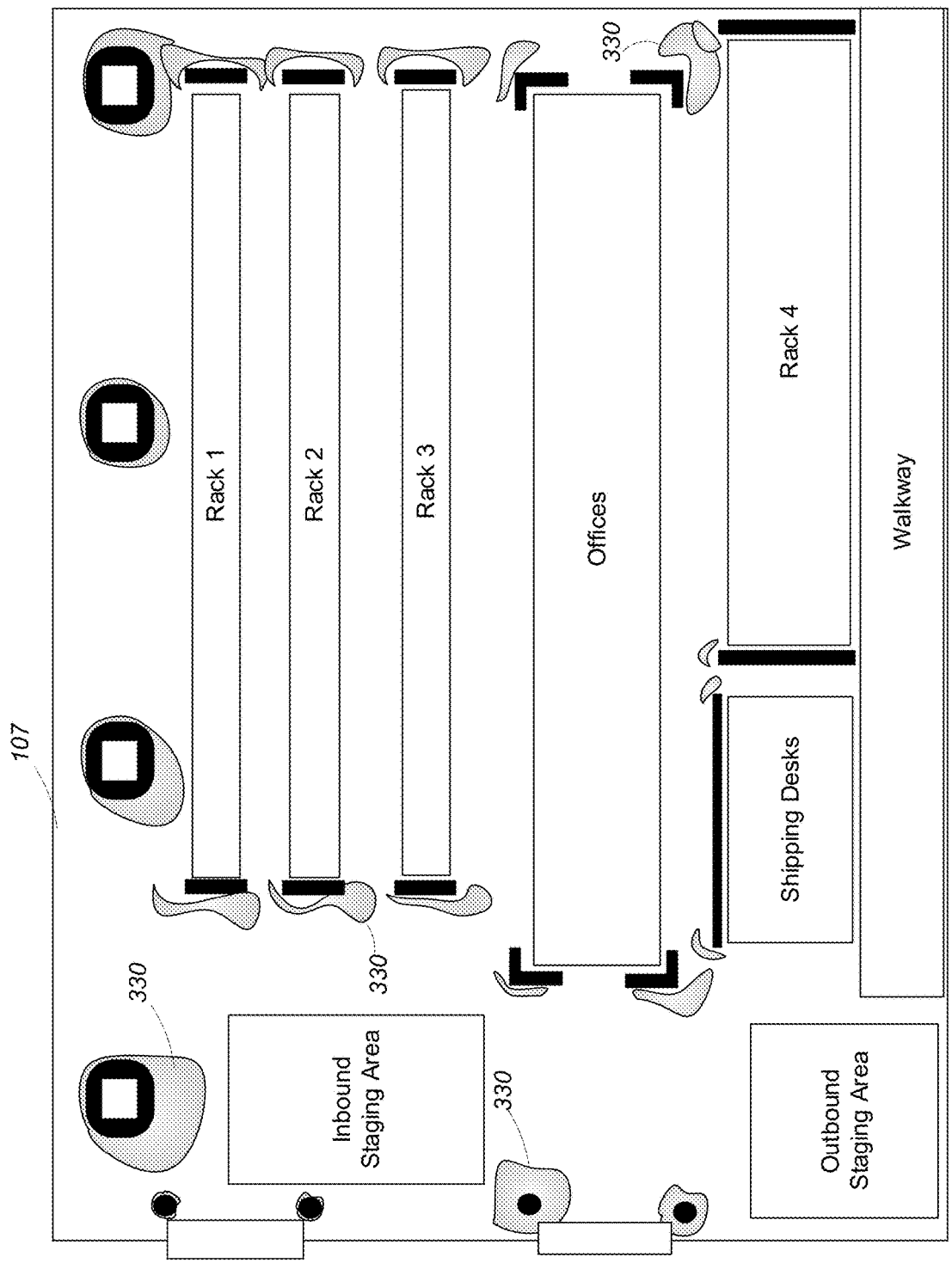
FIG. 3 is a heat map of a facility.

Referring to FIG. 3, in some examples, the aggregated sensor data for a facility 105 can be processed to generate a heatmap that graphically displays how often and/or hard protective equipment devices 302 in the facility 305 is struck. Such a map can help identify "hot spots" (e.g., greyed area 330) where the equipment configuration of the facility 305 should be reevaluated to determine if a reconfiguration, signage, or another mitigating approach would reduce accidents.

In some examples, the sensor data includes directional information in addition to acceleration information such that direction of impact can be shown in the heatmaps or in other presentations of sensor data to the user.

4 Miscellaneous Features

In some examples, a user interface (e.g., a cell phone application or a PC application) can be used to display sensor data to the user. In the user interface, the severity of impacts can be shown using colors (e.g., red indicating a severe impact, yellow indicating a less severe but significant impact, and green representing non-severe impact.)

In some examples, the sensor includes a power supply and is powered from the power grid. In other examples, the sensor is battery powered. The battery may last a number of years (e.g., 2-5 years) when used in the sensor.

In some examples, the sensor is integrated into protective equipment elements rather than being affixed thereto.

In some examples, the sensor is waterproof. In other examples, the sensor is water resistant and/or weather resistant.

In some examples, the sensor is configured to operate over a wide variety of temperature and humidity ranges (e.g., −50 F to 130 F and 0%-100% humidity).

In some examples, each sensor is associated with a unique identifier such that it can be uniquely identified and tracked in the equipment monitoring system.

In some examples, the central monitor and data store are eliminated, and the facility monitor performs the functions of the central monitor and the data store locally at the facility.

The sensors are described above as wirelessly communicating the sensor data. However, it should be noted that at least some of the sensors may use wired connections (e.g., Ethernet) to communicate the sensor data.

In some examples, the sensors communicate sensor data once per day unless an impact exceeding a certain threshold is exceeded. In the case of an impact exceeding the threshold, the sensor data is transmitted immediately.

5 Implementations

The approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A monitoring system comprising:
   a storage device; and
   a monitoring module configured to:
   receive sensor data from a plurality of sensors installed on elements disposed in a facility, the sensor data characterizing an effect of physical impacts on the elements;
   store the sensor data in the storage device;
   process the stored sensor data to generate information characterizing effects of the one or more physical impacts on the elements over time; and
   provide the information characterizing effects of the one or more physical impacts on the elements over time for presentation to a user of the monitoring system,
   wherein processing the stored sensor data includes identifying patterns in the sensor data and the patterns are related to a frequency of one or more of the elements disposed in the facility being struck.

2. The system of claim 1 wherein the sensor data includes acceleration data.

3. The system of claim 2 wherein the sensor data includes directional information associated with the acceleration data.

4. The system of claim 1 wherein the monitoring module is implemented at the facility and the plurality of sensors communicates with the monitoring module wirelessly.

5. The system of claim 1 wherein the facility includes a local monitor in communication with the monitoring module and the plurality of sensors communicates with the local monitor wirelessly, the local monitor transmitting the sensor data to the monitoring module.

6. The system of claim 5 wherein the monitoring module is implemented in a computing cloud.

7. The system of claim 1 wherein at least some of the sensors are installed on protective equipment in the facility.

8. The system of claim 1 wherein at least some of the sensors are installed on mobile equipment in the facility.

9. The system of claim 8 wherein the mobile equipment includes one of fork trucks, hand trucks, automated guided vehicles, and shopping carts.

10. The system of claim 1 wherein at least some of the sensors are installed on one or more of bollards, column protectors, pedestrian barriers, corner protectors, bumpers, and rack end protectors.

11. The system of claim 1 wherein the patterns are related to a severity of the effect of impacts on one or more of the elements disposed in the facility.

12. The system of claim 1 wherein the patterns include a time series of the effect of impacts on one or more of the elements disposed in the facility.

13. The system of claim 1 wherein at least some of the sensors including a gyroscope for measuring the effect of one or more impacts on the elements.

14. The system of claim 1 wherein the information characterizing effects of the one or more impacts on the elements over time includes a cumulative effect of impacts on one or more of the elements over time.

15. The system of claim 1 wherein the presented information includes an indication that one or more of the elements is potentially damaged.

16. The system of claim 1 wherein the presented information includes a heatmap illustrating the effects of the one or more impacts on the elements in the facility over time.

17. The system of claim 1 wherein one or more of the elements in the facility includes critical facility equipment.

* * * * *